(12) United States Patent
Graham

(10) Patent No.: US 11,418,727 B2
(45) Date of Patent: Aug. 16, 2022

(54) ACTUATED STATIC MASKS FOR CODED APERTURE IMAGING

(71) Applicant: Simmonds Precision Products, Inc., Vergennes, VT (US)

(72) Inventor: Jason Graham, Prior Lake, MN (US)

(73) Assignee: Simmonds Precision Products, Inc., Vergennes, VT (US)

(*) Notice: Subject to any disclaimer, the term of this patent is extended or adjusted under 35 U.S.C. 154(b) by 66 days.

(21) Appl. No.: 16/728,198

(22) Filed: Dec. 27, 2019

(65) Prior Publication Data

US 2021/0203822 A1 Jul. 1, 2021

(51) Int. Cl.
| | |
|---|---|
| *H04N 5/262* | (2006.01) |
| *H04N 5/238* | (2006.01) |
| *F42B 15/01* | (2006.01) |
| *H04N 5/265* | (2006.01) |
| *H04N 5/225* | (2006.01) |

(52) U.S. Cl.
CPC ............. *H04N 5/238* (2013.01); *F42B 15/01* (2013.01); *H04N 5/265* (2013.01); *H04N 5/2252* (2013.01); *H04N 5/2253* (2013.01); *H04N 5/2254* (2013.01)

(58) Field of Classification Search
CPC ...................................................... H04N 5/238
See application file for complete search history.

(56) References Cited

U.S. PATENT DOCUMENTS

| | | | |
|---|---|---|---|
| 4,506,374 A | 3/1985 | Flynn | |
| 5,606,165 A * | 2/1997 | Chiou | G01T 1/295 250/363.06 |
| 8,212,914 B2 | 7/2012 | Chiu | |
| 9,685,251 B2 | 6/2017 | Gorelick | |
| 10,382,700 B1 | 8/2019 | Dragavon | |
| 10,437,132 B1 | 10/2019 | Koehler | |
| 2016/0276129 A1 * | 9/2016 | Stevens | H01J 37/222 |
| 2018/0209850 A1 | 7/2018 | Raz et al. | |

(Continued)

FOREIGN PATENT DOCUMENTS

| | | |
|---|---|---|
| EP | 0920643 A1 | 6/1999 |
| WO | 199726557 A1 | 7/1997 |

OTHER PUBLICATIONS

Kittle, D. et al., "Multiframe Image Estimation for Coded Aperture Snapshot Spectral Imagers", Applied Optics, Optical Society of America, vol. 49, No. 36, Dec. 20, 2010, pp. 6824-6833.

(Continued)

*Primary Examiner* — Gary C Vieaux
(74) *Attorney, Agent, or Firm* — Locke Lord LLP; Joshua L. Jones; Scott D. Wofsy

(57) ABSTRACT

A method includes forming a first image of a scene through a static coded aperture onto a sensor with the static coded aperture in a first position relative to the sensor, shifting the coded aperture to a second position relative to the sensor, and forming a second image of the scene through the static coded aperture onto the sensor with the static coded aperture in the second position. Two or more images can be formed in this way. The method includes forming a combined image by deconvolving the two or more images and combining data from the two or more images into the combined image. The combined image can be a more accurate representation of the scene than either of the first and second images.

8 Claims, 3 Drawing Sheets

(56) References Cited

U.S. PATENT DOCUMENTS

2019/0063875 A1\* 2/2019 Ell .......................... F42B 15/01
2019/0147609 A1   5/2019 Lohry et al.

OTHER PUBLICATIONS

Extended European Search Report dated May 25, 2021, issued during the prosecution of European Patent Application Mo. EP 20216925.6.

\* cited by examiner

ACTUATED STATIC MASKS FOR CODED APERTURE IMAGING

BACKGROUND

1. Field

The present disclosure relates to imaging, and more particularly to coded aperture imagery.

2. Description of Related Art

Images can be formed on a sensor using optics such as a lens assembly to focus the image of a scene on the sensor. It is also possible to form an image on a sensor without optics such as lenses. For example, a small pinhole through a mask can admit light from a scene to a sensor to form an image, wherein the sharpness of the image is limited by the size of the pinhole. In coded aperture imagery, multiple holes or pinholes are defined through the mask. This forms multiple convolved images on the sensor. There are computational algorithms that allow for deconvolving the convolved images to allow coded aperture imagery without the need for the bulk and weight of optics.

The conventional techniques have been considered satisfactory for their intended purpose. However, there is an ever present need for improved systems and methods for improved imaging systems and methods, e.g., that fit into smaller spaces and are robust to extreme environments. This disclosure provides a solution for this need.

SUMMARY

A method includes forming a first image of a scene through a static coded aperture onto a sensor with the static coded aperture in a first position relative to the sensor, shifting the coded aperture to a second position relative to the sensor, and forming a second image of the scene through the static coded aperture onto the sensor with the static coded aperture in the second position. The method includes forming a combined image by deconvolving the first and second images and combining data from the first and second images into the combined image. The combined image can be a more accurate representation of the scene than either of the first and second images.

The method can include shifting the coded static aperture to at least one additional position and forming at least one respective additional image with the coded static aperture in the at least one additional respective position. Forming the combined image can include deconvolving the at least one additional image and combining data from the first image, second image, and at least one additional image to form the combined image. The first and second images can be formed without focusing light from the scene onto the sensor with traditional lensed optics. Shifting the coded aperture to the second position can include shifting the coded aperture in at least one direction in a plane parallel to the sensor, such as in a translational direction and/or in a rotational direction.

A system includes a sensor operatively connected to a power supply and controller for producing image data from images formed on the sensor. A static coded aperture is included with an actuator mounting the static coded aperture in a position to form an image of a scene on the sensor. The controller is operatively connected to the actuator and to the sensor to form a first image on the sensor with the static coded aperture in a first position relative to the sensor, shift the static coded aperture to a second position relative to the sensor, form a second image on the sensor with the static coded aperture in the second position, and output a combined image including data from the first and second images.

The actuator can include piezoelectric elements connected to the static coded aperture to move the static coded aperture translationally relative to the sensor. The actuator can include piezoelectric elements connected to the static coded aperture to move the static coded aperture rotationally relative to the sensor. There is an optical path from the scene to the sensor through the static coded aperture, wherein the optical path can be free of lens optics. A housing can be included, wherein the sensor is mounted to the housing, and wherein the actuator mounts the static coded aperture to the housing. The housing can be a component of a guided munition, e.g. wherein the housing is mounted to the guided munition.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
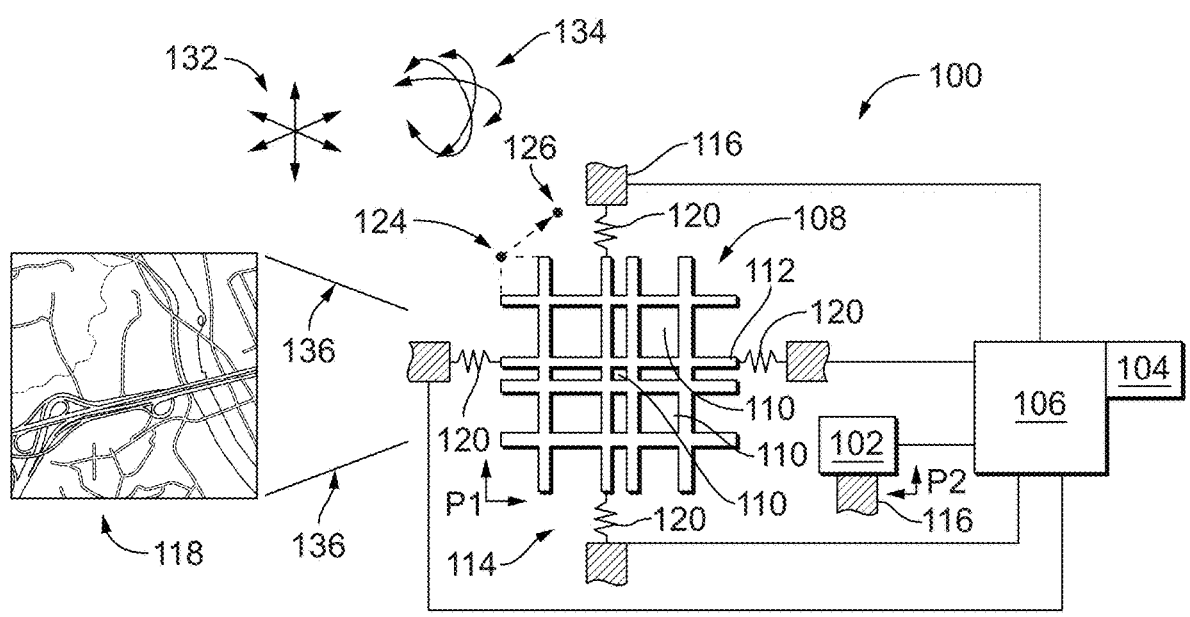
FIG. 1 is a schematic view of an embodiment of a system constructed in accordance with the present disclosure, showing the static coded aperture and the actuator for moving the coded static aperture relative to the sensor.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to form images using a static coded aperture, i.e. a coded aperture where the pattern in the coded aperture does not change even if the coded aperture moves from position to position. This can allow for forming quality images without the need for the bulk and weight of traditional optics such as lens assemblies, or e.g. as an alternative to using an SLM (spatial light modulator) for creating a moving/changing coded aperture.

A system 100 includes a sensor 102, e.g. a focal plane array, operatively connected to a power supply 104 and controller 106 for producing image data from images formed on the sensor 102. A static coded aperture 108 is included, i.e. wherein there is a pattern of apertures 110 through an opaque mask 112 wherein the pattern of apertures 110 does not change. An actuator mounts 114 the static coded aperture 108 to a housing 116 in position to form an image of a scene 118 the sensor 102. In FIG. 1, the actuator 114 includes four piezoelectric elements 120, however those skilled in the art will readily appreciate that any suitable actuator configuration (or number of piezoelectric elements, for example) can be used without departing from the scope of this disclosure.

The controller 106 is operatively connected to the piezoelectric elements 120 of the actuator 114 and to the sensor 102 to form a first image 122 of a first view 123 of the scene 118 (shown in FIG. 2) on the sensor 102 with the static coded aperture 108 in a first position 124 relative to the sensor 102. The controller is configured to shift the static coded aperture 108 to a second position 126 relative to the sensor 102 and form a second image 128 of a second view 129 of the scene 118 (shown in FIG. 2) on the sensor 102 with the static coded aperture in the second position 126. It should be noted that the first and second positions 124, 126 are known, e.g., to the controller 106. Using the mask pattern and location of its shadow allow for the controller 106 to output a combined image 130 (shown in FIG. 2) including data from the first and second images 122, 128.

Piezoelectric elements 120 can be connected to the static coded aperture 108 to move the static coded aperture translationally relative to the sensor 102 (as indicated in FIG. 1 by the translational arrows 132, and/or to move the static coded aperture 108 rotationally relative to the sensor 102 (as indicated by the rotational arrows 134 in FIG. 1). There is an optical path 136 from the scene 118 to the sensor 102 through the static coded aperture 108 and the optical path can be free of lens optics, which considerably lightens and reduces the size of imaging systems.

Figure 2:
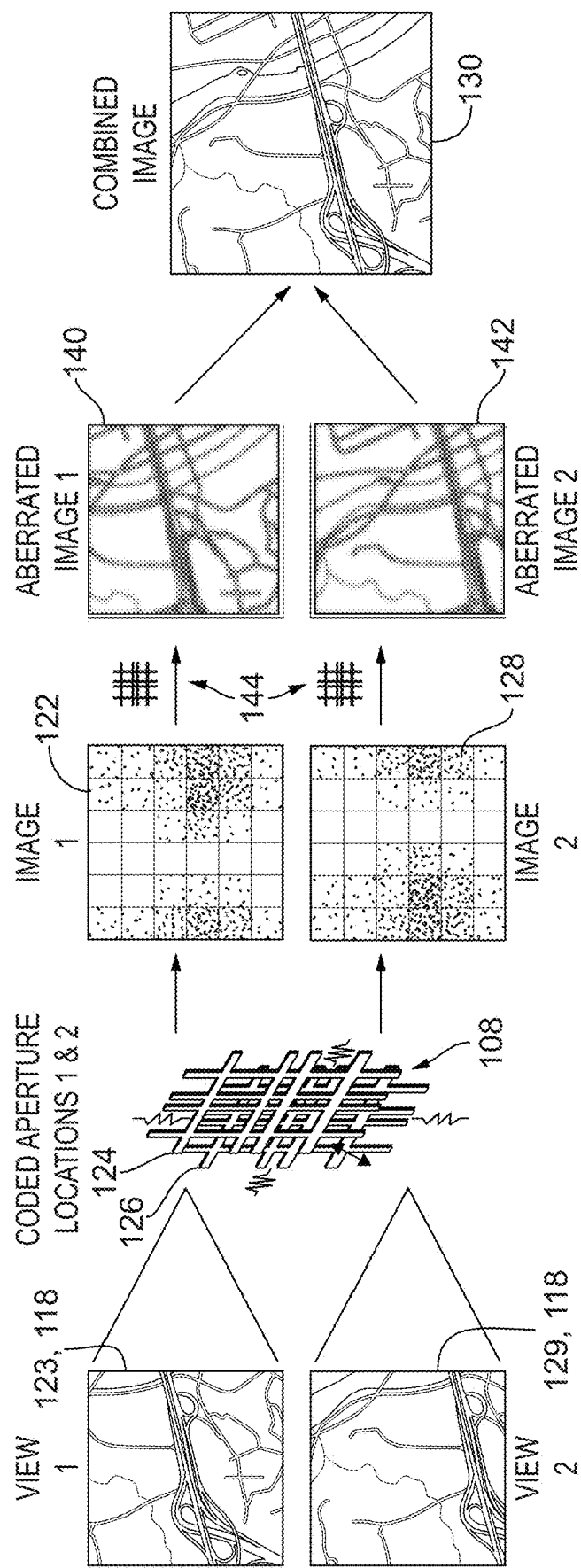
FIG. 2 is a schematic view of an embodiment of a process in accordance with the present disclosure, showing creation of a combined image from two images taken with the static mask in two different respective positions.

With reference now to FIG. 2, a method includes forming a first image 122 of the first view 123 of the scene 118 through a static coded aperture 108 onto a sensor (e.g. sensor 102 shown in FIG. 1) with the static coded aperture in a first known position (e.g. position 124 shown in FIGS. 1-2) relative to the sensor. The method includes shifting the coded aperture 108 to a second known position relative to the sensor (e.g., to position 126 shown in FIGS. 1-2), and forming a second image 128 of the second view 129 of the scene 118 through the static coded aperture 108 onto the sensor with the static coded aperture 108 in the second position. The method includes deconvolving each of the respective images 122, 128 into respective aberrated images 140, 142 and forming the combined image 130 by combining data from the first and second images (after deconvolving images 122, 128 based on the static coded aperture 108 and its known respective positions as indicated with reference character 144 in FIG. 2). A processing unit, controller 106 (e.g., a processing device either in a projectile or elsewhere) can perform the deconvolution and combination of images. The combined image 130 is a more accurate, less aberrated, representation of the scene 118 than either of the first and second images (in their aberrated, deconvolved state). Those skilled in the art will readily appreciate that the method can include obtaining multiple images, each with the static coded aperture 108 in a different respective image, and that the image quality of the combined image can be enhanced by incorporating deconvolved, aberrated image data from each image obtained. The images can be formed without focusing light from the scene 118 onto the sensor with optics. Shifting the coded aperture 108 to the second position can include shifting the coded aperture in at least one direction within a plane P1. Plane P1 is parallel to the plane P2, in which the sensor 102 is located (in other words, the sensor 102 defines the plane P2). The coded aperture 108 can move in a translational direction and/or in a rotational direction within the plane P1.

Figure 3:
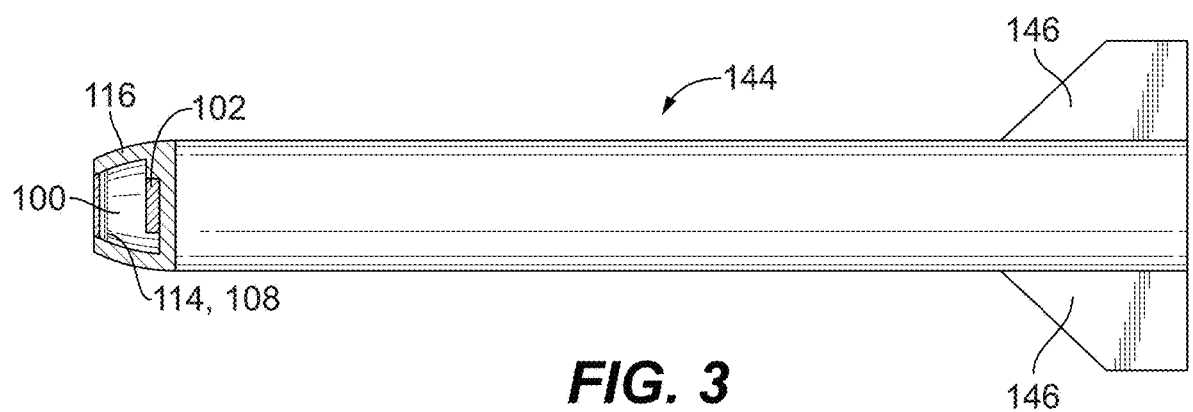
FIG. 3 is a schematic view of the system of FIG. 1, showing the housing mounted to a guided munition.

With reference now to FIG. 3, the housing 116 of FIG. 1 is shown. The sensor 102 is mounted to the housing 116. The actuator 114 mounts the static coded aperture 108 to the housing 116 at a known and e.g. optimized distance from sensor 102. For example, the housing 116 can be a component of a guided munition 144. The housing 116 can be mounted to the guided munition 144 for use in guiding the guided munition 144 by actuating the control surfaces 146 of the guided munition 144.

The methods and systems of the present disclosure, as described above and shown in the drawings, provide for static coded aperture imagery with improved image quality relative to traditional static coded imagery, and can allow for the elimination of the bulk and weight of optics such as lens assemblies from imaging systems. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
    forming a first image of a scene through a static coded aperture onto a sensor with the static coded aperture in a first position relative to the sensor;
    shifting the coded aperture to a second position relative to the sensor, wherein the shifting includes rotation out of plane relative to the sensor;
    forming a second image of the scene through the static coded aperture onto the sensor with the static coded aperture in the second position; and
    forming a combined image by deconvolving the first and second images and combining data from the first and second images into the combined image.

2. The method as recited in claim 1, further comprising shifting the coded static aperture to at least one additional respective position and forming at least one respective additional image with the coded static aperture in the at least one additional respective position, wherein forming the combined image includes deconvolving the at least one respective additional image and combining data from the first image and the at least one respective additional image to form the combined image.

3. The method as recited in claim 1, wherein the first and second images are formed without focusing light from the scene onto the sensor with traditional lensed optics.

4. The method as recited in claim 1, wherein shifting the coded aperture to the second position includes shifting the coded aperture in at least one direction in a plane parallel to the sensor.

5. The method as recited in claim 4, wherein shifting the coded aperture to the second position includes shifting the coded aperture in a translational direction.

6. The method as recited in claim 4, wherein shifting the coded aperture to the second position includes shifting the coded aperture in a rotational direction.

7. The method as recited in claim 4, wherein shifting the coded aperture to the second position includes shifting the coded aperture in a translational direction and in a rotational direction.

8. The method as recited in claim 1, wherein the combined image is a more accurate representation of the scene than either of the first and second images.

* * * * *